No. 785,333. PATENTED MAR. 21, 1905.
F. O. SODERSTROM.
WATER HEATER.
APPLICATION FILED OCT. 24, 1901.
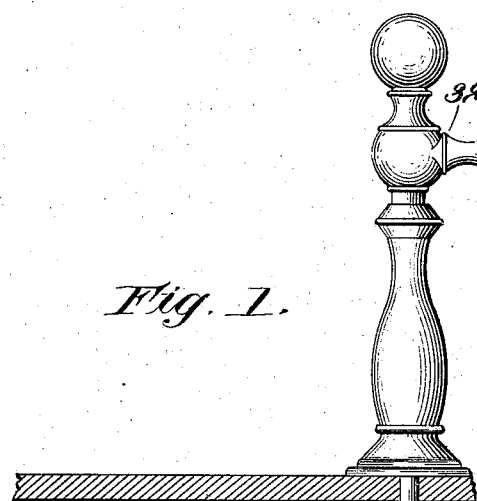
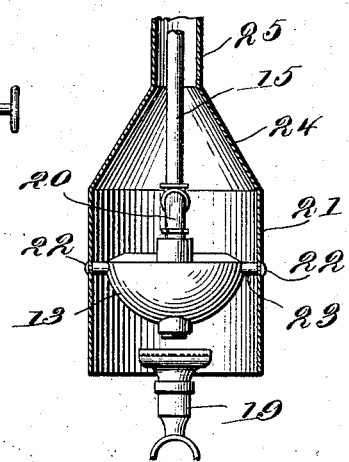
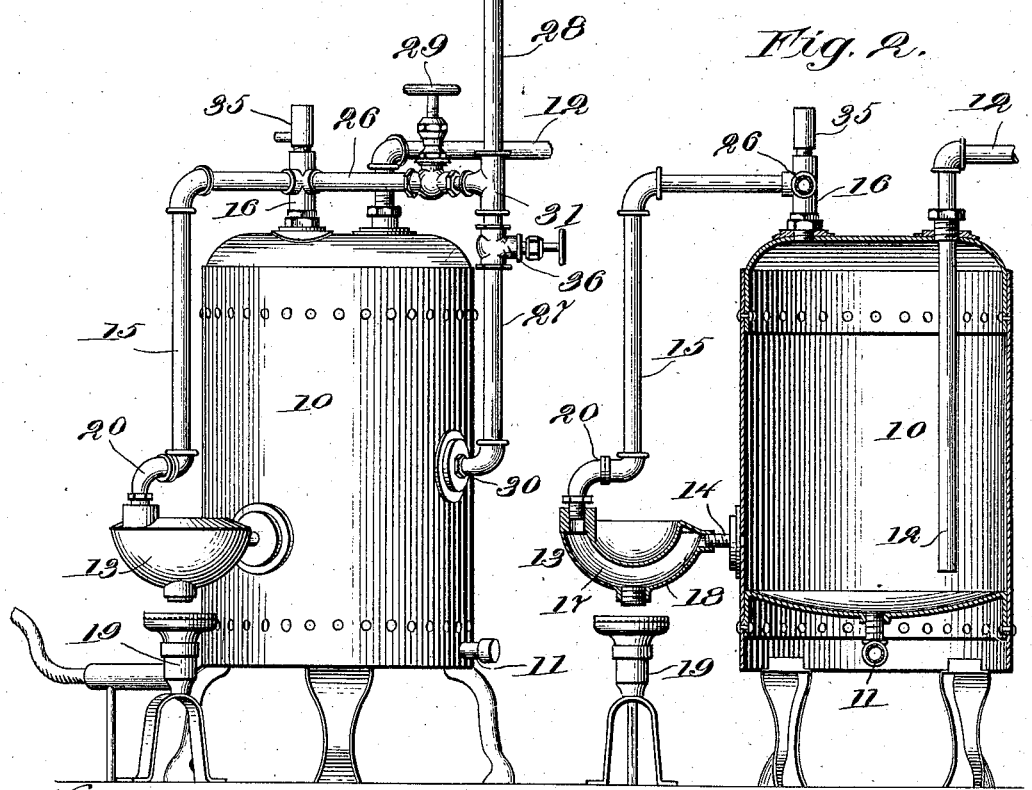
Witnesses:
H. S. Gaither
Helen L. Peck
Inventor:
Frank O. Soderstrom
by Wm. P. Belt
his Attorney No. 785,333.

Patented March 21, 1905.

UNITED STATES PATENT OFFICE.

FRANK O. SODERSTROM, OF CHICAGO, ILLINOIS.

WATER-HEATER.

SPECIFICATION forming part of Letters Patent No. 785,333, dated March 21, 1905.

Application filed October 24, 1901. Serial No. 79,856.

*To all whom it may concern:*

Be it known that I, FRANK O. SODERSTROM, a citizen of the United States, residing at Chicago, in the county of Cook and State of Illinois, have invented certain new and useful Improvements in Water-Heaters, of which the following is a specification.

This invention relates to novel improvements in water-heaters of the kind largely employed at soda-fountains and other places where hot drinks are dispensed and also in barber-shops and elsewhere where a constant supply of hot water is maintained.

The object of the invention is to heat the water quickly and maintain a constant supply thereof at a minimum expense and without danger of explosion or destroying the heater and to construct the heater so that the extremely hot or cooler water can be drawn therefrom as may be desired.

Heretofore it has been customary to draw the water off at the top of the tank in heaters of this general character, and as the hottest water always rises to the surface or the top of the tank it has been necessary to allow this hot water to run off in order to obtain water at a lower temperature. When the water becomes superheated and steam is generated, it has been necessary to draw all this off before being able to get water of a lower temperature. This exhaustion of hot water is annoying and entails delay, and aside from being annoying it materially increases the expense by necessitating the heating of considerable more water than is actually necessary, and if it should happen that the extremely hot water is desired immediately after the hot water has been run off to obtain water at a less temperature another delay will occur while the water in the tank is being raised to the proper temperature. It is the object of my invention, therefore, as previously stated, to provide an apparatus for heating water quickly and maintaining a constant supply thereof at a minimum expense, so that the hottest water may be drawn from the top of the tank or as it is heated or the cooler water at or about the middle of the tank may be drawn without exhausting the hottest water, whereby it is possible to obtain water from the tank at a lower temperature without first allowing the hot water to run off until the desired temperature is reached, which results in a material saving in the expense of heating and enables the maintenance of a considerable volume of warm water and a minimum volume of the hot water, which, however, can be constantly renewed and supplied; and a further object of the invention is to embody in a heater of this general character a water-heating box of novel construction for quickly heating the water and discharging the same back into the tank or delivering it directly into the discharge-pipe for immediate use.

In the accompanying drawings I have illustrated the invention embodied in a water-heater provided with a draft-arm for use in dispensing hot soda and similar drinks; but it will be understood that the invention can be employed in any connection where it will be useful and is by no means limited to the particular application thereof herein shown.

In the drawings, Figure 1 is an elevation showing the water-heater connected with a draft-arm mounted on a counter or table shown in section. Fig. 2 is a sectional elevation of the detached heater. Fig. 3 is a detail view showing the heating-box surrounded by a hood in section.

Like numerals of reference designate corresponding parts in the several figures.

Referring to the drawings, 10 is a tank of suitable size and construction and provided with a normally closed drain 11 and an inlet-pipe 12, connected with a city service-pipe or other source of water-supply and extending down in the tank and discharging at the bottom thereof.

A water-heater 13 of suitable character is arranged at one side of the tank and connected therewith by means of a pipe-section 14, tapped into the side of the tank near the bottom thereof, and by a pipe 15, which is connected with a short pipe or cross 16, discharging into the top of the tank. I prefer to employ the cup-shaped water-heater illustrated in the drawings, which consists, essentially, of outer and inner cup-shaped walls, connected together at their upper edges and providing a water-chamber 17, which distributes the water in its passage through the heating-box in a comparatively thin film over the entire surface of the outer wall 18, which constitutes the heating-surface, heat being applied from any suitable source, as by a burner 19. The pipe 15 is preferably located directly above the center of the heating-box and has its lower end formed in an ogee curve 20 by means of two elbows or otherwise and connected with the box so that the heat rising from the box will also heat this pipe and keep the water therein at a high temperature. I prefer to inclose the heating-box in a hood 21, Fig. 3, which is fastened to the box by screws 22 passing through the hood and screwing into threaded openings in lugs 23 on the box, these lugs serving also to hold the hood at a distance from the box to provide sufficient draft and permit the flame to lick up around the sides and edges of the box and the heat to rise. The hood is preferably extended downward a sufficient distance to inclose the burner, so the flame will not be affected by lateral drafts, and the upper part of the hood is preferably contracted at 24 and extended upward a sufficient distance in the form of an inclosing sleeve 25, surrounding the pipe 15. In this way I obtain a maximum heat efficiency and confine it so that the water circulating through the heating-box and its discharge-pipe will be raised to a high temperature during its passage. The upright pipe 16 consists, essentially, of a cross, to which the heating-box delivery-pipe 15 is connected and to which one branch, 26, of the tank delivery-pipe 28 is connected, this branch of the tank delivery-pipe extending horizontally across the top of the tank and taking the water from the top of the tank or from the pipe 15. The tank delivery-pipe is also provided with another branch, 27, which is tapped into the side of the tank at 30 at or about its middle, the two branches of this pipe being connected with the main pipe at 31. The top branch is provided with a globe-valve 29 for a purpose presently described. The tank delivery-pipe is connected with a draft-arm 32 or delivers the water in any manner and to any place for use. By constructing the heater in this manner the inlet-pipe 12 may be connected to a service-pipe and remain constantly open, so that water will flow into the tank and be discharged at the bottom thereof as fast as it is drawn off from the delivery-pipe 28, thereby entirely eliminating all danger of the tank exploding. However, I provide a safety-valve 35 at the top of the cross 16 to permit an excess of steam to escape, whether due to accidental shutting off of the water-supply or otherwise.

The water circulates from a point near the bottom of the tank, through the heater and its delivery-pipe 15, into the top of the tank, the hottest water remaining at the top of the tank. The hot water can be drawn off from the top of the tank or from the heating-box delivery-pipe 15 at any time, as the valve 29 is normally open. When the hot water in the top of the tank becomes exhausted, the hot water flowing through the delivery-pipe 15 from the heating-box will pass directly through the top branch 26 into the main delivery-pipe 28 without entering the tank, and as the construction and arrangement of the heating-box are such as to quickly raise the temperature of the water to a high degree it is always possible to obtain hot water, while at the same time it is not necessary to maintain a large quantity of hot water in the tank, and for which reason it is unnecessary to maintain a high degree of heat. A gang of two or more heaters may be coupled together when extremely hot water is desired instantly in large quantities. When it is desired to draw off warm water at less than the maximum temperature, the valve 29 is shut and the water is drawn from the middle of the tank. The water in the side branch 27 below the connection 31 will not rise to be delivered through said pipe while the valve 29 remains open, but the hot water will be delivered through the branch 26 from the top of the tank or from the heating-box; but by closing this valve the cooler water may be drawn from the middle of the tank through the branch 27.

In the use of heaters of this character it is sometimes necessary to raise the temperature of practically all the water in the tank until it is hot to provide for a maximum demand, and in this way the water at the top of the tank may become too hot for use; but with my improved heater it is not necessary to draw off this hot water at the top of the tank, for the valve 29 can be shut and the water drawn from the middle of the tank, where it is at a less temperature. It is also impossible to exhaust the hot water from the tank in my improved heater without warning the dispenser that the supply is running low, for the valve 29 can be kept closed and the water drawn from the side of the tank until the cold water is reached, whereupon the valve may be opened to draw water from the top of the tank or directly from the heating-box. After the water in the tank is once heated the heat-supply may be diminished and the water drawn from the side of the tank, and when the water flowing through the delivery-pipe reaches a temperature too low for use the valve can be opened to draw water from the top of the tank and the heat-supply temporarily increased. In this way a constant supply of hot water is maintained and water may be drawn from the tank at a high temperature or at a lower temperature, as desired, and at any city pressure.

One of the important features of the invention consists in the fact that the water-supply is constantly turned on and requires no attention from the user, thereby eliminating entirely all danger to the heater due to the continued application of heat after the water-supply is entirely or nearly exhausted, which can never happen with my improved heater while the water-supply is turned on, and even if the heat continued for an indefinite time without drawing off the water from the tank no serious results will occur, because the hot water will simply back up in the supply-pipe.

It is apparent that this heater will automatically maintain a constant supply of hot water with much less heat and with far superior results than the ordinary heaters heretofore used, in which the water-supply either needs constant attention or the hottest water is always drawn off first.

I am aware that this heater can be used in a great many connections for various purposes and that changes in the form and proportion of parts may be made therein to adapt it to various conditions, and I therefore reserve the right to make all such changes as fall within the spirit and scope of the invention.

In places where an extremely high pressure of water is maintained in city service or other pipes I prefer to employ a globe-valve in the side branch 27 below the connection 31; but under ordinary conditions this additional valve is not necessary. This valve is closed when extremely hot water is desired instantly and before the water in the tank becomes heated sufficiently to prevent the cold water from rising through the side branch 27 and mixing with the hot water passing through the top branch into the delivery-pipe 28. After the water in the tank has become heated this additional valve may be left open, as the water in the side branch will not then rise while the water is being drawn from the top branch, as heretofore described.

By employing a heating-box at the side of the tank in the manner described I avoid the necessity for applying heat directly to the tank, which is often productive of serious results owing to careless attention and accidental exhaustion of water in the tank, and my improved heating-box takes the place of the ordinary coils which have heretofore been employed and which are expensive and difficult to manufacture and connect.

Having thus fully described my invention, what I claim, and desire to secure by Letters Patent, is—

1. In a water-heater of the character described, the combination of a pressure-tank, a water-heating box at one side of the tank and connected therewith, a cross at the top of the tank, a pipe connected with the heating-box and said cross to discharge the heated water into the top of the tank and provide a constant circulation through the heating-box and tank, a hot-water-outlet delivery-pipe having one branch connected with said cross and another branch connected with the side of the tank at or about its middle, and valves in said branches.

2. In a water-heater of the character described, the combination of a pressure-tank, a cross at the top of the tank, a cup-shaped heating-box connected with the side of the tank near its bottom, said box being provided with a hemispherical water-chamber and a convex heating-wall, a delivery-pipe for said box arranged above the center thereof and connected with said cross, and a hot-water-outlet delivery-pipe for the tank having one branch thereof connected to the side of the tank at or about its middle and another branch connected with the cross on the top of the tank, and a valve in each of said branches.

FRANK O. SODERSTROM.

Witnesses:
J. G. CALROW,
WM. O. BELT.